Dec. 27, 1960  F. LEINWEBER  2,966,185
FRUIT STEMMER
Filed June 17, 1958
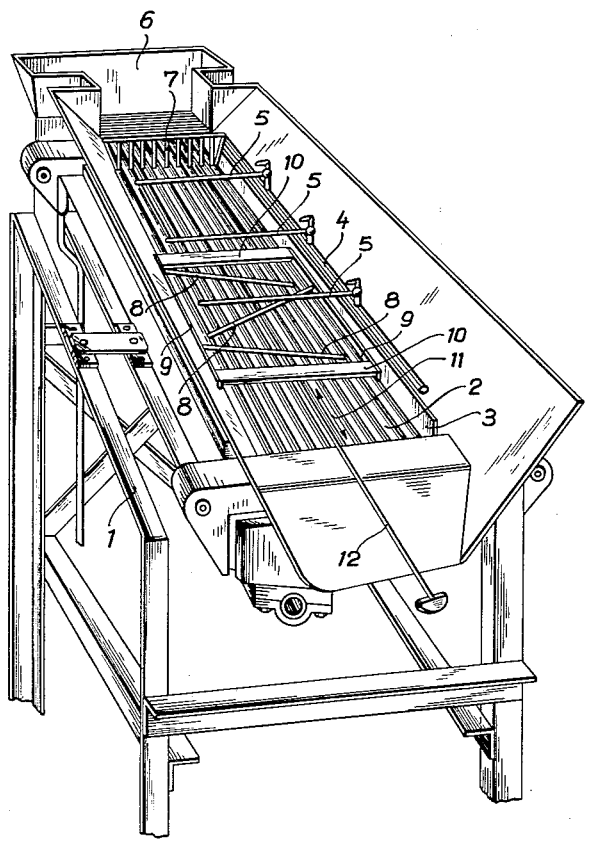
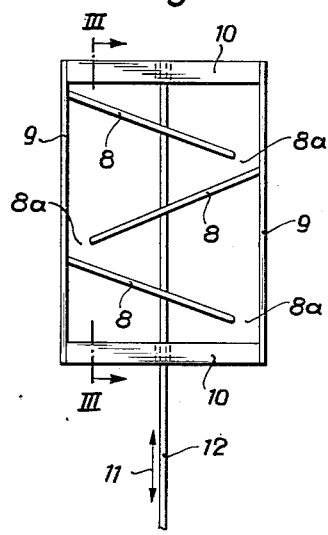
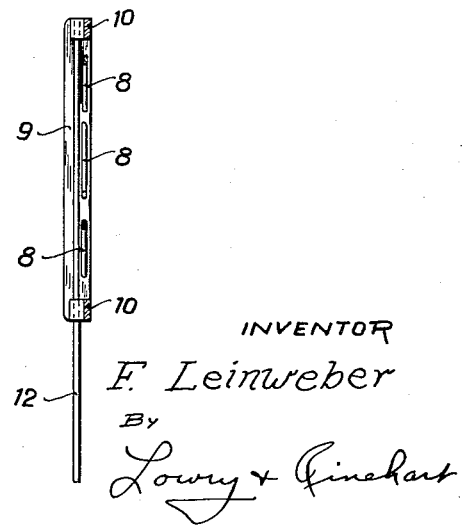
INVENTOR
F. Leinweber
BY
Lowry & Rinehart
ATTYS.

United States Patent Office 2,966,185
Patented Dec. 27, 1960

2,966,185
FRUIT STEMMER
Franz Leinweber, 65 Arndtstrasse, Mainz-Mombach (Rhine), Germany
Filed June 17, 1958, Ser. No. 742,621
Claims priority, application Germany July 23, 1957
2 Claims. (Cl. 146—55)

The invention relates to apparatus for removing the stalks from fruit, for example from cherries and the like. Apparatus for this purpose are known which consist of a roll bed, the rolls of which rotate in pairs in opposite directions with the object of gripping and tearing the stalk off the fruit travelling along the roll bed. In order to feed the fruit to the tearing or plucking grooves stationary guide rolls are arranged parallel to each other above the so-called dead channels or grooves between each two pairs of rolls. This arrangement of the guide rolls cannot however ensure that the stalks are gripped reliably in the plucking groove, the effect being merely that, apart from leading off the fruit laterally, the dead channels are covered.

It has been found in practice that most of the fruit slides along the tearing or plucking grooves with their heads directed downwardly and their light stalks directed upwardly or laterally, so that the stalks are removed from only some of the fruit by the plucking grooves, while the stalks from the remainder have to be subsequently removed by hand.

To eliminate said disadvantages it is the object of the present invention to provide a stalk removing apparatus in which guide plates or guide rods are arranged alternately at oblique angles transversely above the roll bed with a free passage for the fruit at the free end of the guide rods.

By this measure the material, for example cherries, rolling in the longitudinal direction of the rotating rolls of the bed are deflected from their direction of travel and rolled laterally in alternating directions so that the stalks projecting upwardly or sideways are gripped by the pairs of rotating rolls and torn off. In addition the stalk removing operation is assisted considerably by the fact that the oblique guide rods are moved to and fro in the longitudinal direction of the tube bed with the result that fruit rolls continually. To attain this object the guide rods are mounted in a frame or carriage the free ends of which consist of transversely directed thin laths resting on their broad sides and the outer edges of which are preferably scarfed, and the carriage is reciprocated in the longitudinal direction of the roll bed. By this arrangement the rolling cherries are temporarily checked in their forward movement, rolled over and any stalks which are difficult to pluck are torn off. The carriage may be moved by any suitable means (not shown).

As the material, fruit, from which the stalks are to be removed and which is fed to the apparatus at the head end thereof drops promiscuously onto the roll bed, it is advantageous for it to be loosened up and spread out on the roll bed right at the outset, as thereby the operation of the oblique guide plates is assisted. With this object in view a gate or comb with widely spaced elastic teeth is arranged following the feed hopper, which comb distributes the material over the entire width of the bed and controls the feed to the guide tubes thereby increasing their effectiveness.

The apparatus is not only suitable for removing the stalks from cherries or the like, but can also be used with equal advantage for stripping fruit, such as currents and the like, off their stalks.

A preferred embodiment of the invention is illustrated by way of example in the accompanying drawing in which:

Fig. 1 is a perspective view of the apparatus;
Fig. 2 shows the carriage of the apparatus in top plan view and on a larger scale, and
Fig. 3 is a longitudinal section of Fig. 2.

A chute of trough-shaped cross section, sloping in downward direction towards the front end, is mounted in known manner on a frame 1 and comprises a bottom bed 2 composed of rolls, rod-shaped rubber cylinders or the like, arranged in longitudinal direction and rotatable in pairs in opposite directions. Along the longitudinal sides of the bed 2, plates or walls 3 are arranged as well as a water tube conduit 4 from which tubular arms 5 extend transversely across the bed 2 at distances apart and continually spray and wash the material to be dealt with.

A fixed gate or weir, such as a comb 7 with sufficiently wide-spaced elastic teeth is fitted at the inlet 6 to the roll bed a sufficient distance above the bed to loosen up the material falling thereon and spread it over the entire width of the bed 2.

Guide rods 8 are provided over the bed 2 and extend alternately in oblique direction to form a passage 8a at the free end, which tubes deflect the material laterally out of its longitudinal direction of travel and at the same time roll it over.

The guide rods 8 are preferably arranged within a frame or carriage 9 the ends of which are constructed from laths 10 resting with their broad side on the roll bed. The carriage is preferably moved to and fro over the bed 2 in the direction of the arrow 11. This can be effected by hand for example by means of a handle 12.

The carriage may, however, also be actuated mechanically, for which purpose means, such as an eccentric or cam mechanism, are provided which are operated by the motor drive of the apparatus. In this case the lateral plates or walls 3 of the roll bed 2 can be utilized for transmitting the movement.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. Apparatus for de-stemming fruit comprising an elongated roll bed having opposite sides and disposed at a downwardly extending angle and having an inlet at its upper end, a plurality of pairs of longitudinally extending stem-picking rolls rotatable in pairs in opposite directions, said guide rod means extending from one side of said roll bed, overlying the same and terminating short of the other side of said bed, said rod means including a removable support frame including side members and overlying said roll bed, and rods anchored at one end in said side members and projecting alternately and angularly therefrom toward the opposite side member at an acute angle relative to said side member in which it is anchored and relative to an alternate rod to provide a continuous tortuous path for the fruit to cause lateral movement thereof as it passes longitudinally along said roll bed.

2. The structure of claim 1; said frame being reciprocably supported for longitudinal movement along said roll bed.

References Cited in the file of this patent

UNITED STATES PATENTS

| | | |
|---|---|---|
| 1,403,946 | Hachmuth | Jan. 17, 1922 |
| 2,048,470 | Sanborn | July 21, 1936 |
| 2,702,574 | Green | Feb. 22, 1955 |
| 2,703,125 | Dodgen | Mar. 1, 1955 |